US 8,260,081 B2

(12) United States Patent
Takagi

(10) Patent No.: US 8,260,081 B2
(45) Date of Patent: Sep. 4, 2012

(54) IMAGE PROCESSING DEVICE, METHOD, PROGRAM, AND STORAGE MEDIUM FOR FACE OR RED EYE DETECTION

(75) Inventor: Atsushi Takagi, Yokohama (JP)

(73) Assignee: Canon Kabushiki Kaisha (JP)

( * ) Notice: Subject to any disclaimer, the term of this patent is extended or adjusted under 35 U.S.C. 154(b) by 973 days.

(21) Appl. No.: 12/118,416

(22) Filed: May 9, 2008

(65) Prior Publication Data
US 2008/0279427 A1 Nov. 13, 2008

(30) Foreign Application Priority Data

May 11, 2007 (JP) ................................ 2007-127192

(51) Int. Cl.
G06K 9/40 (2006.01)
G06K 9/00 (2006.01)
H04N 5/228 (2006.01)
(52) U.S. Cl. ...... 382/275; 382/169; 382/118; 348/222.1
(58) Field of Classification Search .................. 382/169, 382/275, 118; 348/222.1
See application file for complete search history.

(56) References Cited

U.S. PATENT DOCUMENTS

| | | | | |
|---|---|---|---|---|
| 7,840,037 | B2 * | 11/2010 | Lu et al. ........................ | 382/118 |
| 2005/0025474 | A1 * | 2/2005 | Ono .............................. | 396/311 |
| 2005/0062856 | A1 * | 3/2005 | Matsushita ................. | 348/222.1 |
| 2005/0207649 | A1 * | 9/2005 | Enomoto et al. .............. | 382/190 |
| 2005/0232490 | A1 * | 10/2005 | Itagaki et al. ................. | 382/190 |
| 2005/0238217 | A1 * | 10/2005 | Enomoto et al. .............. | 382/128 |
| 2006/0028675 | A1 * | 2/2006 | Watanabe et al. ............ | 358/1.15 |
| 2006/0227385 | A1 * | 10/2006 | Kawada ......................... | 358/302 |
| 2006/0274978 | A1 * | 12/2006 | Fukuda et al. ................. | 382/305 |
| 2007/0065044 | A1 * | 3/2007 | Park et al. ...................... | 382/305 |
| 2007/0201742 | A1 * | 8/2007 | Hayashi ......................... | 382/167 |
| 2009/0060293 | A1 * | 3/2009 | Nagao et al. .................. | 382/118 |
| 2009/0135269 | A1 * | 5/2009 | Nozaki et al. .............. | 348/222.1 |

FOREIGN PATENT DOCUMENTS

| | | |
|---|---|---|
| JP | 11-127371 A | 5/1999 |
| JP | 2004-145287 A | 5/2004 |
| JP | 2006-092153 A | 4/2006 |

OTHER PUBLICATIONS

Office Action issued Aug. 2, 2011 for corresponding Japanese Patent Application No. 2007-127192.

* cited by examiner

Primary Examiner — Wenpeng Chen
(74) Attorney, Agent, or Firm — Rossi, Kimms & McDowell LLP

(57) ABSTRACT

An image processing device which is capable of efficiently performing face-detection, red-eye detection, and/or image data correction including red-eye correction without waste when there are a plurality of chances of performing the image data correction including the red-eye correction on a single image. A printing apparatus acquires image data and information concerning a face detection process performed on the image data from an image pickup apparatus. A controller of the printing apparatus determines to cause the printing apparatus to perform a face detection process on the acquired image data, based on the acquired information. The information contains an information item concerning detection accuracy of the performed face detection process, and a face detection process with higher detection accuracy than the detection accuracy described in the information is determined as the face detection process to be performed by the printing apparatus.

32 Claims, 12 Drawing Sheets

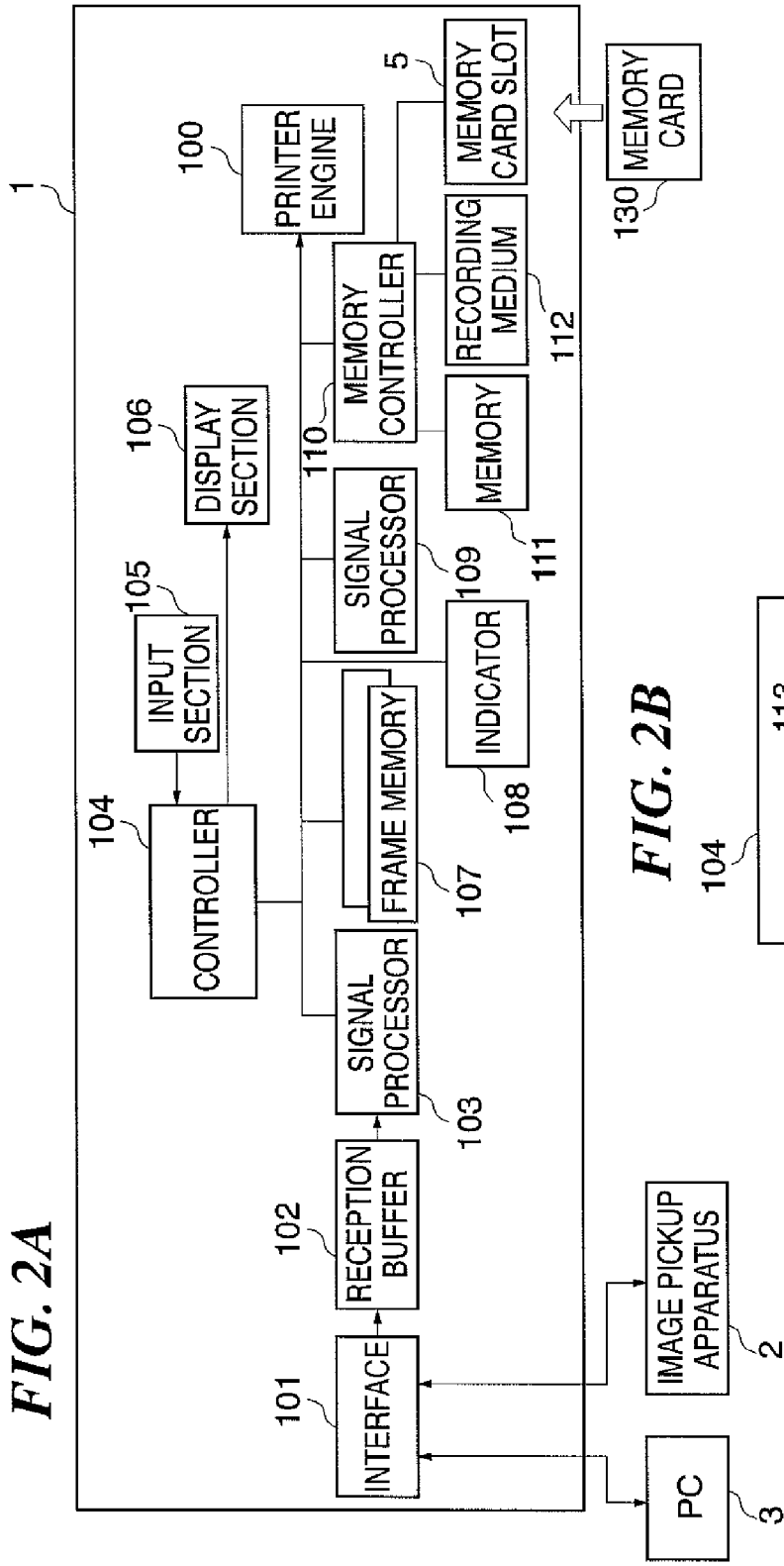
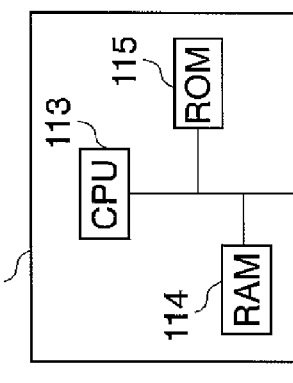

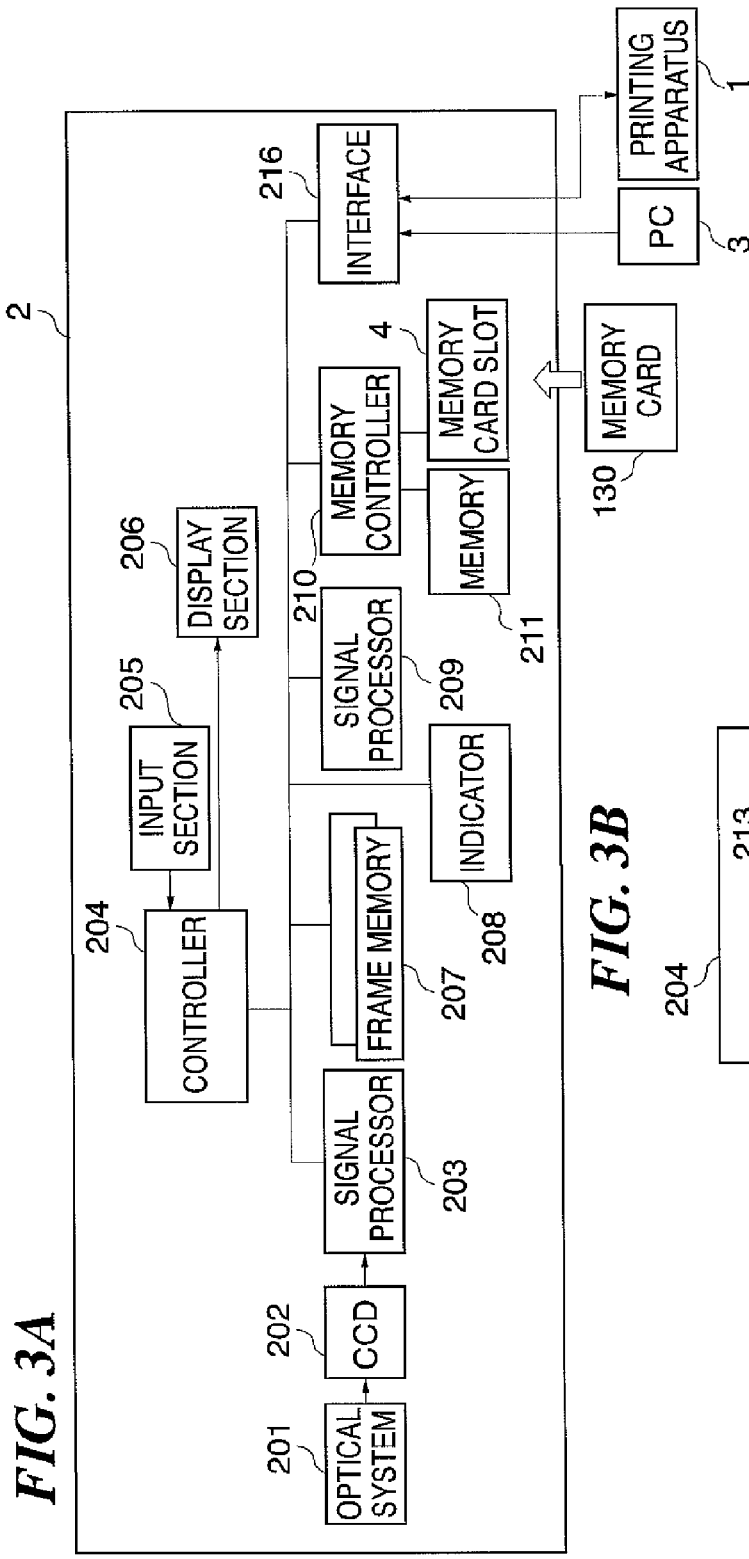
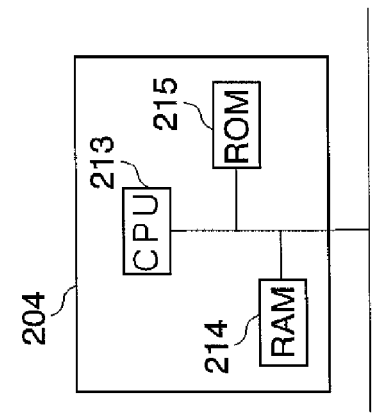
FIG. 3A
FIG. 3B

IMAGE PROCESSING DEVICE, METHOD, PROGRAM, AND STORAGE MEDIUM FOR FACE OR RED EYE DETECTION

BACKGROUND OF THE INVENTION

1. Field of the Invention

The present invention relates to an image processing device for detecting red eye (red-eye phenomenon) occurring in image data picked up e.g. by an image pickup apparatus, or a face in the image data, an image processing method, a program for implementing the image processing method, and a storage medium storing the program.

2. Description of the Related Art

In general, an image pickup apparatus, such as a digital camera or a digital video camera, performs predetermined image processing on an imaging signal obtained by an image pickup operation, and records the signal subjected to the image processing, as image data, in a removable memory card. The image data is recorded as an Exif (Exchangeable Image File Format) file in the memory card. The Exif, particularly the Exif 2.2 specifies information to be recorded, in a detailed manner, so as to easily achieve improvement of print image quality. For example, the Exif 2.2 file is comprised of a start code, a header section, a data section, and a stop code, as shown in FIG. 16. The header section of the Exif 2.2 file contains Exif tags and a thumbnail image. In the respective Exif tags, there are recorded shooting information items concerning the presence/absence of a flash, a shooting mode (portrait/landscape/fidelity), and so forth. The data section stores image data.

Examples of a printing apparatus for printing out image data picked up by the image pickup apparatus include a digital photo printer and a direct printer.

A digital photo printer is configured to print image data picked up by an image pickup apparatus, or to optically scan a silver salt film and print out image data obtained by the scanning.

For example, in the case of printing image data picked up by an image pickup apparatus, a digital photo printer refers to shooting information in the Exif tags recorded together with the image data, and performs optimal printing according to the shooting information. For example, when image data is picked up by the image pickup apparatus with the exposure mode thereof set to auto, the image data can be underexposed or overexposed for some reason against a photographer's intention. In such a case, the digital photo printer recognizes, based on shooting information of the Exif tags, that the exposure mode is set to auto, and performs density correction on the image data such that the underexposed or overexposed portion of the image data can be printed out as an optimally exposed image. On the other hand, when image data is picked up by the image pickup apparatus with the exposure mode thereof intentionally set to manual by the photographer, the digital photo printer recognizes, based on shooting information of the Exif tags, that the exposure mode is set to manual, and does not perform excessive density correction on the image data.

Further, when halation occurs in image data due to automatic light emission from a strobe, the digital photo printer recognizes, based on shooting information of the Exif tags, that automatic light emission from the strobe may have caused the halation in the image data. Then, the digital photo printer corrects the image data such that a proper image density is obtained by carrying out processing e.g. for reducing the brightness of the colors of bright portions (halation portions) of the image data.

As described above, in a digital photo printer, shooting information recorded as Exif tags is used as conditions for optimizing image processing to be performed on image data. More specifically, a digital photo printer prints out an image as desired by a photographer, through recognition of a shooting mode, an exposure mode, and whether the image was taken with or without a flash, based on the shooting information of the Exif tags. However, to be compatible with the Exif 2.2, a digital photo printer is required to have a high image processing capability. To achieve this high image processing capability, a digital photo printer incorporates an image processing device (image processor) with a high processing speed and a large processing capacity, such as a PC (personal computer), a CPU (MPU), or a plurality of CPUs (MPUs).

In shooting a portrait or the like, a red-eye phenomenon that the eyes (pupils) of a person are photographed in red can occur. Occurrence of the red-eye phenomenon causes considerable degradation of image quality. To solve this problem, there have been proposed digital photo printers each capable of performing a red-eye correction process so as to correct red eye. In one method of red-eye correction, for example, a person's face is detected from an image by detection processing, such as edge detection or hue detection (face detection), and then whether pupils are red is detected from the detected face (red-eye detection). When red-eye pupils are detected, the pupils (image data thereof) are subjected to color conversion and the like, whereby correction of the red-eye pupils (red-eye correction) is performed. Further, a face area detected by the face detection is also corrected such that the brightness of the area is optimized. However, execution of the face detection and the red-eye detection in the digital photo printer applies a large load to the digital photo printer, which sometimes makes it difficult to perform red-eye correction along with density correction, or prolongs processing time.

A direct printer is directly connected to the image pickup apparatus without using a personal computer, or has mounted therein a memory card removed from the image pickup apparatus, and captures image data directly from the image pickup apparatus or the memory card to print out the same. Execution of red-eye correction requires high processing capability, and hence there has been proposed no direct printer which is capable of performing the red-eye correction.

On the other hand, an image pickup apparatus has come along that is capable of performing face detection, red-eye detection, and red-eye correction. If face detection, red-eye detection, and red-eye correction are performed by the image pickup apparatus, it is possible to eliminate the need for causing a digital photo printer to carry out the same processing, to thereby reduce load applied to the digital photo printer. Further, if the image pickup apparatus is capable of performing red-eye correction, it is not necessary to equip a direct printer with the function of performing red-eye correction.

However, not all image pickup apparatuses are necessarily equipped with the function of performing red-eye correction. Further, an image pickup apparatus does not always perform red-eye correction on all pieces of image data in which red eye occurs. To cope with this problem, it can be envisaged to perform both red-eye correction and density correction on all pieces of image data e.g. in a digital photo printer. However, this can cause an extra increase in processing time for red-eye correction as described above, and hence there is a fear that productivity may be reduced.

In view of this, there has been proposed a printer which is capable of performing red-eye correction efficiently without causing degradation of productivity (see Japanese Patent Laid-Open Publication No. 2004-145287). Specifically, this printer determines a possibility of occurrence of red eye, using shooting information stored in Exif tags attached to image data by an image pickup apparatus, and performs redeye correction only on an image having a possibility of occurrence of red eye. The shooting information recorded as the Exif tags concerns a shooting mode and the like. For example, when strobe shooting is recorded as shooting information on an image, it is determined that red eye may have occurred in the image, and red-eye correction is performed on the image data.

As described above, red-eye correction can be performed by an image processing device of an image pickup apparatus, a printer or the like, and hence there are a plurality of chances of performing red-eye correction for a single image. Therefore, if each of the apparatuses performs red-eye correction on all images, there can be cases where a single image is subjected to the same red-eye correction a plurality of times.

SUMMARY OF THE INVENTION

The present invention provides an image processing device which is capable of efficiently performing face-detection, red-eye detection, and/or image data correction including red-eye correction without waste when there are a plurality of chances of performing the image data correction including the red-eye correction on a single image, an image processing method, a program for implementing the image processing method, and a storage medium for storing the program.

In a first aspect of the present invention, there is provided an image processing device comprising an acquisition unit configured to acquire image data and information concerning a face detection process performed on the image data, a determination unit configured to determine a face detection process to be performed on the image data acquired by the acquisition unit, based on the information acquired by the acquisition unit, and a face detection unit configured to perform the face detection process determined by the determination unit on the image data, wherein the information contains an information item concerning detection accuracy of the face detection process performed on the image data, and the determination unit determines a face detection process with higher detection accuracy than the detection accuracy of the face detection process described in the information, as the face detection process to be performed by the face detection unit.

In a second aspect of the present invention, there is provided an image processing method comprising an acquisition step of acquiring image data and information concerning a face detection process performed on the image data, a determination step of determining a face detection process to be performed on the image data acquired in the acquisition step, based on the information acquired in the acquisition step, and a face detection step of performing the face detection process determined in the determination step on the image data, wherein the information contains an information item concerning detection accuracy of the face detection process performed on the image data, and in the determination step, a face detection process with higher detection accuracy than the detection accuracy of the face detection process described in the information is determined as the face detection process to be performed in the face detection step.

In a third aspect of the present invention, there is provided a program for causing a computer to execute an image processing method, wherein the image processing method comprises an acquisition step of acquiring image data and attribute information describing a result of execution of a first detection process for detecting a face in the image data, a determination step of determining based on the acquired attribute information whether or not a second detection process for detecting a face in the acquired image data is to be performed on the acquired image data, and a detection step of performing the second detection process when it is determined in the determination step that the second detection process is to be performed.

In a fourth aspect of the present invention, there is provided a storage medium storing a program for causing a computer to execute an image processing method, in a computer-readable manner, wherein the image processing method comprises an acquisition step of acquiring image data and attribute information describing a result of execution of a first detection process for detecting a face in the image data, a determination step of determining based on the acquired attribute information whether or not a second detection process for detecting a face in the acquired image data is to be performed on the acquired image data, and a detection step of performing the second detection process when it is determined in the determination step that the second detection process is to be performed.

In a fifth aspect of the present invention, there is provided an image processing device comprising an acquisition unit configured to acquire image data and information concerning a red-eye detection process performed on the image data, a determination unit configured to determine a red-eye detection process to be performed on the image data acquired by the acquisition unit, based on the information acquired by the acquisition unit, and a red-eye detection unit configured to perform the red-eye detection process determined by the determination unit on the image data, wherein the information contains an information item concerning detection accuracy of the red-eye detection process performed on the image data, and the determination unit determines a red-eye detection process with higher detection accuracy than the detection accuracy of the red-eye detection process described in the information, as the red-eye detection process to be performed by the red-eye detection unit.

In a sixth aspect of the present invention, there is provided an image processing method comprising an acquisition step of acquiring image data and information concerning a red-eye detection process performed on the image data, a determination step of determining a red-eye detection process to be performed on the image data acquired in the acquisition step, based on the information acquired in the acquisition step, and a red-eye detection step of performing the red-eye detection process determined in the determination step on the image data, wherein the information contains an information item concerning detection accuracy of the red-eye detection process performed on the image data, and in the determination step, a red-eye detection process with higher detection accuracy than the detection accuracy described in the information is determined as the red-eye detection process to be performed in the red-eye detection step.

In a seventh aspect of the present invention, there is provided a program for causing a computer to execute an image processing method, wherein the image processing method comprises an acquisition step of acquiring image data and attribute information describing a result of execution of a first detection process for detecting a red eye in the image data, a determination step of determining based on the acquired attribute information whether or not a second detection process for detecting a red eye in the acquired image data is to be performed on the acquired image data, and a detection step of performing the second detection process when it is determined in the determination step that the second detection process is to be performed.

In an eighth aspect of the present invention, there is provided a storage medium storing a program for causing a computer to execute an image processing method, in a computer-readable manner, wherein the image processing method comprises an acquisition step of acquiring image data and attribute information describing a result of execution of a first detection process for detecting a red eye in the image data, a determination step of determining based on the acquired attribute information whether or not a second detection process for detecting a red eye in the acquired image data is to be performed on the acquired image data, and a detection step of performing the second detection process when it is determined in the determination step that the second detection process is to be performed.

The features and advantages of the invention will become more apparent from the following detailed description taken in conjunction with the accompanying drawings.

BRIEF DESCRIPTION OF THE DRAWINGS

FIGS. 2A and 2B are block diagrams of the printing apparatus appearing in FIG. 1.

FIGS. 3A and 3B are block diagrams of the image pickup apparatus appearing in FIG. 1.

DETAILED DESCRIPTION OF THE PREFERRED EMBODIMENTS

The present invention will now be described in detail with reference to the drawings showing preferred embodiments thereof.

Figure 1:
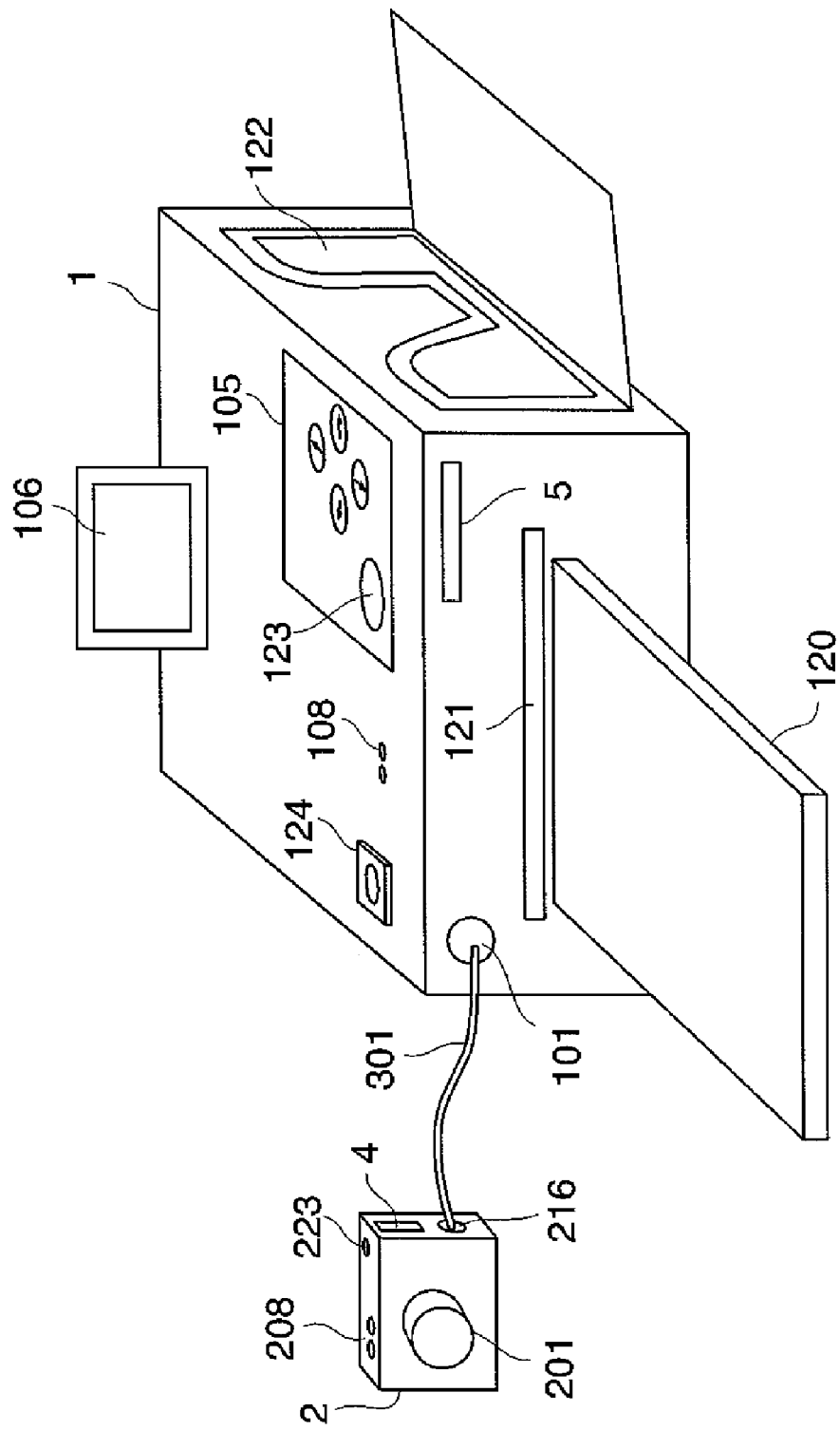
FIG. 1 is a schematic view of the appearance of a printing apparatus incorporating an image processing device according to a first embodiment of the present invention, and an image pickup apparatus connected to the printing apparatus.

FIG. 1 is a schematic view of the appearance of a printing apparatus incorporating an image processing device according to a first embodiment of the present invention, and an image pickup apparatus connected to the printing apparatus.

As shown in FIG. 1, the printing apparatus 1 has a feed tray 120 removably mounted to a front surface thereof for feeding recording sheets, and a media cassette 122 removably mounted therein for feeding an ink ribbon for use in printing on a recording sheet.

The printing apparatus 1 has a sheet discharge port 121, a memory card slot 5, and an interface 101 arranged in the front surface thereof. The sheet discharge port 121 is configured such that a printed recording sheet can be discharged therefrom. The memory card slot 5 is configured to receive a memory card (see FIG. 2A), such as an SD card, a memory stick, or a CF (registered trademark) card. The interface 101 is configured to provide interface for communicative connection to external apparatuses, such as the image pickup apparatus 2 implemented by a digital still camera, and a personal computer (hereinafter referred to as "the PC") 3.

Further, in a top surface of the printing apparatus 1, there are arranged an input section 105 via which a user instruction is input, indicator 108 for giving an error indication and the like, a power switch 124 for use in turning on the printing apparatus 1, and a display section 106. The input section 105 has a plurality of buttons including a print execution button 123 for use in giving an instruction for starting of printing. The display section 106 displays a preview of an image to be printed, a copy count designated by the user via the input section 105, and details of image processing including trimming.

The image pickup apparatus 2 connected to the printing apparatus 1 via the interface 101 of the printing apparatus 1 and a cable 301 is a digital still camera, and includes a lens 201 and a flash device (not shown). In a side surface of the image pickup apparatus 2, there are arranged an interface 216 for connection to the interface 101 of the printing apparatus 1, and a memory card slot 4 for receiving a memory card (see FIG. 3A). In a top surface of the image pickup apparatus 2, there are arranged a shutter button 223 and an indicator 208 for notification of occurrence of an error. Further, in a rear surface of the image pickup apparatus 2, there is disposed a display section (see FIG. 3A) comprised of a liquid crystal display panel for displaying an image to be picked up, or an already recorded image.

Next, the internal configuration of the printing apparatus 1 will be described with reference to FIGS. 2A and 2B. FIGS. 2A and 2B are block diagrams of the internal configuration of the printing apparatus 1 appearing in FIG. 1.

As shown in FIG. 2A, the printing apparatus 1 includes a controller 104. As shown in FIG. 2B, the controller 104 is comprised of a CPU 113, a ROM 115, and a RAM 114. The ROM 115 stores programs for controlling the overall operation of the printing apparatus 1 and programs for executing individual processes. The CPU 113 uses the RAM 114 as a work area to read out and execute the programs stored in the ROM 115, thereby controlling the overall operation of the printing apparatus 1 and performing the individual processes. The individual processes include image processing processes for carrying out face detection, red-eye detection, and red-eye correction, as described hereinafter.

Further, the printing apparatus 1 includes the interface 101, a reception buffer 102, a signal processor 103, a frame memory 107, a signal processor 109, a memory controller 110, a printer engine 100, an input section 105, and the display section 106, and the indicator 108.

The interface 101 provides interface for communicative connection to external apparatuses, such as the image pickup apparatus 2 and the PC 3, as described hereinabove. The interface 101 receives image data transferred in units of frames from the image pickup apparatus 2 or the PC 3 connected thereto. The received frames of image data are stored in the reception buffer 102.

The signal processor 103 captures image data from the reception buffer 102 or from the memory card 130 mounted in the memory card slot 5, and performs pre-processing, such as resizing and/or rotation, on the image data, followed by outputting the processed image data. The image data output from the signal processor 103 is stored in the frame memory 107. The image data stored in the frame memory 107 is subjected, as required, to face detection, red-eye detection, and red-eye correction, described hereinafter, by the CPU 113 of the controller 104. The face detection, the red-eye detection, and the red-eye correction are performed following a program stored in the ROM 115.

The image data stored in the frame memory 107 is input to the signal processor 109, and the signal processor 109 converts the image data into image data in a format directly interpretable by the printer engine 100 (for example, in printing using three colors, the image data is divided into three single-color plates, i.e. a cyan plate, a magenta plate, and a yellow plate). The image data converted into the format directly interpretable by the printer engine 100 is sent to the printer engine 100 in timing synchronous with sheet feeding by the printer engine 100.

The printer engine 100 prints out image data sent from the signal processor 109, and outputs a recording sheet having an associated image printed thereon.

The memory controller 110 stores reusable image data, template image data, and the like data in a memory 111, and reads out image data stored in the memory 111, as required. The memory 111 is implemented e.g. by a hard disk device or a RAM. Further, the memory controller 110 records image data having undergone predetermined image processing, in a recording medium 112 implemented e.g. by a CD-R or a DVD-R. The memory controller 110 also reads out image data from the memory card 130 mounted in the memory card slot 5, and sends the read-out image data to the signal processor 103.

The input section 105 includes the print execution button 123 (see FIG. 1) and various operating keys (not shown) for use in setting a copy count. The display section 106 is comprised of a liquid crystal display panel for displaying a preview image of image data to be printed, and the like. The indicator 108 is implemented e.g. by LEDs, and flashes on and off when an error occurs in the printing apparatus 1.

Next, the configuration of the image pickup apparatus 2 will be described with reference to FIGS. 3A and 3B. FIGS. 3A and 3B are block diagrams of the image pickup apparatus 2 appearing in FIG. 1.

As shown in FIG. 3A, the image pickup apparatus 2 includes a controller 204. As shown in FIG. 3B, the controller 204 is comprised of a CPU 213, a ROM 215, and a RAM 214. The ROM 215 stores programs for controlling the overall operation of the image pickup apparatus 2 and programs for executing individual processes. The CPU 213 uses the RAM 214 as a work area to read out and execute the programs stored in the ROM 215, thereby controlling the overall operation of the image pickup apparatus 2 and performing the individual processes.

Further, the image pickup apparatus 2 includes an optical system 201, a CCD 202, a signal processor 203, a frame memory 207, a signal processor 209, a memory controller 210, an interface 216, an input section 205, and the display section 206, and the indicator 208. The image pickup apparatus 2 further includes the flash device (not shown).

The CCD 202 receives an optical image picked up via the optical system 201 and converts the received optical image into an electric signal. This electric signal is converted into a digital signal (image data) by an A/D converter (not shown), followed by being input to the signal processor 203.

The signal processor 203 performs pre-processing, such as resizing and/or rotation, on the received image data, and then the image data having undergone the pre-processing is stored in the frame memory 207.

The image data stored in the frame memory 207 is subjected to face detection, red-eye detection, and red-eye correction, as required, by the controller 204.

The image data stored in the frame memory 207 is input to the signal processor 209. The signal processor 209 compresses the received image data to generate compressed image data (e.g. JPEG data). The memory controller 210 records the compressed image data in the memory 211 or the memory card 130 mounted in the memory card slot 4. The compressed image data recorded in the memory 211 or the memory card 130 is read out by the memory controller 210 and is transferred to the printing apparatus 1 or the PC 3 via the interface 216.

The input section 205 has various keys including the shutter button. When one of the keys is operated by the user, an instruction assigned to the key is input to the controller 204. Instructions for execution of the aforementioned face detection, red-eye detection, and red-eye correction can be input by operating the input section 205. Further, by operating the input section 205, it is possible to input an instruction for transferring image data recorded in the memory 211 or the memory card 130 mounted in the memory card slot 4, via the interface 216, to the printing apparatus 1 for printing. Further it is possible to input an instruction for transferring image data to the PC 3 via the interface 216. When an instruction is input from the input section 205, the controller 204 executes control for causing an operation associated with the instruction to be performed.

The display section 206 is comprised of a liquid crystal display panel, and displays image data currently picked up or image data recorded in the memory 211 or the memory card 130 mounted in the memory card slot 4. The indicator 208 is implemented e.g. by LEDs, and flashes on and off when an error occurs in the image pickup apparatus 2.

The image pickup apparatus 2 and the printing apparatus 1 in the present embodiment are each capable of performing face detection, red-eye detection, and red-eye correction. Specifically, as described in Background of the Invention, first, a person's face is detected from an image by processing, such as edge detection or hue detection (face detection). Then, it is determined whether red eye is detected of pupils in the extracted face (red-eye detection). When red-eye pupils are detected, the pupils (image data thereof) are subjected to color conversion and the like, whereby correction of the red-eye pupils (red-eye correction) is performed. Further, the image pickup apparatus 2 and the printing apparatus 1 are capable of executing face correction in which color conversion is performed to optimize the hue of a face area detected by the face detection and that of an area surrounding the face area.

Figure 4A:
FIGS. 4A and 4B are views useful in explaining an example of face detection in a face detection mode for detecting faces of a designated number of people.
Figure 4B:
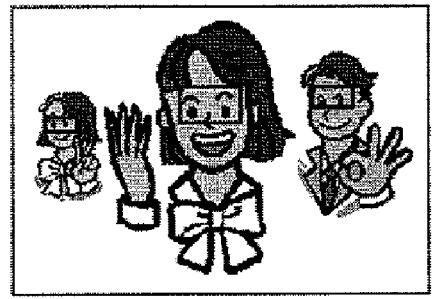
Figure 5A:
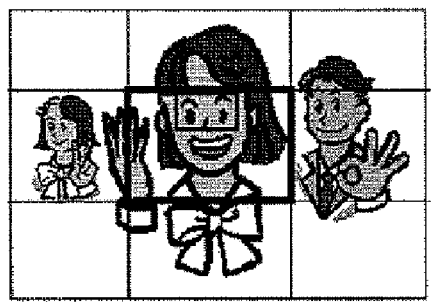
FIGS. 5A and 5B are views useful in explaining an example of face detection in a face detection mode for detecting a face in a designated face detection area.
Figure 5B:
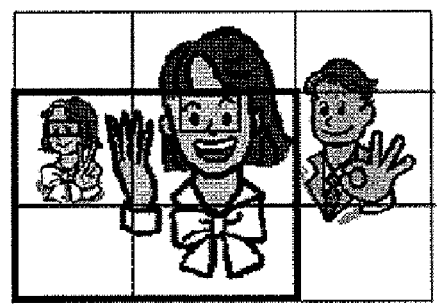
Figure 6A:
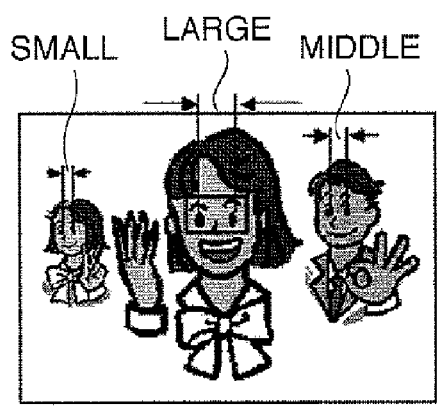
FIGS. 6A and 6B are views useful in explaining an example of face detection in a face detection mode for detecting a face of a designated face size.
Figure 6B:
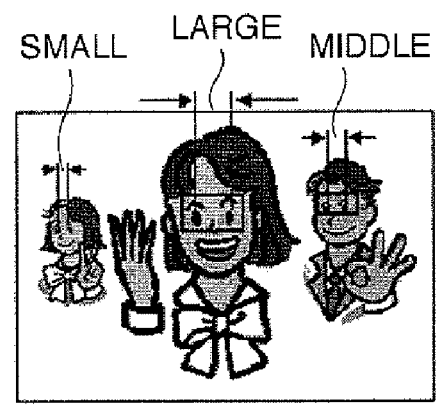
Figure 7A:
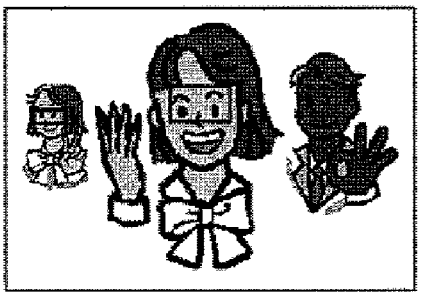
FIGS. 7A and 7B are views useful in explaining an example of face detection in a face detection mode for detecting a face of a designated hue.

Now, face detection will be described with reference to FIGS. 4A to 7B. FIGS. 4A and 4B are views useful in explaining an example of face detection in a face detection mode for detecting faces of a designated number of people. FIGS. 5A and 5B are views useful in explaining an example of face detection in a face detection mode for detecting a face in a designated face detection area. FIGS. 6A and 6B are views useful in explaining an example of face detection in a face detection mode for detecting a face of a designated face size. FIGS. 7A and 7R are views useful in explaining an example of face detection in a face detection mode for detecting a face of a designated hue.

There are provided a plurality of face detection modes, and face detection is performed in a mode selected from the provided face detection modes. Specifically, the face detection modes include four modes, i.e. the mode for detecting faces of a designated number of people, the mode for detecting a face in a designated face detection area, the mode for detecting a face of a designated face size, and the mode for detecting a face of a designated hue.

When the face detection mode for detecting faces of a designated number of people is selected, the number of people for face detection is designated by the user, and the faces of the designated number of people are detected. For example, in the case of processing an image with three people appearing therein as shown in FIG. 4A, if the user designates the number of people for face detection as 1, only the face of one person of the three people is detected. It is also possible to designate the number of people for face detection as "all". In this case, as shown in FIG. 4B, the faces of the respective three people are detected from the image in which the three people appear.

In the case of the face detection mode for detecting a face in a designated face detection area, from a plurality of predetermined areas, at least one area for detecting a face is designated as a face detection area by the user, and the face of a person present in the face detection area is detected. In the present example, as shown in FIG. 5A, nine blocks obtained by dividing an entire image area into nine are set as designable areas, and the user designates at least one desired block as a detection area. In the case of the example shown in FIG. 5A, one block located in the center of the entire image area is designated as a face detection area, and the face of a person present in the designated area is detected. On the other hand, in FIG. 5B, four of the nine blocks in a lower left-side region are designated as a face detection area, and the faces of people present within the designated four blocks are detected.

In the case of the face detection mode for detecting a face of a designated face size, the size of a face for detection is designated by the user, and a face of a size equal to or larger than the designated face size is detected. A face size is measured with respect to a standard distance between left and right eyes, for example. Further, three sizes of "large", "middle", and "small" are set as sizes for designation, for example, and one of the three sizes is designated by the user. For example, when the "large" size is designated as a face size, faces of the "large" size are detected. In the example shown in FIG. 6A, a face of "large" size is detected.

When the "middle" size is designated as a face size, faces equal to or larger than the "middle" size are detected as shown in FIG. 6B. More specifically, faces of the "large" size and the "middle size" are detected.

Figure 7B:
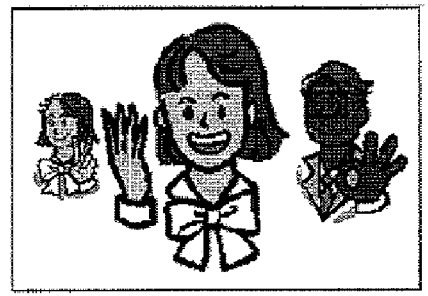

In the case of the face detection mode for detecting a face of a designated hue, the hue of a face for detection is designated by the user, and a face of the designated hue is detected. By the illustrated example, three hues of "white", "yellow", and "brown" are set as designable hues, and one of the three hues is designated by the user. For example, when the "white" is designated as a hue, the face of a person in the center of the image area is detected as shown in FIG. 7A. On the other hand, when the "brown" is designated as a hue, the face of a right-hand person (male) is detected as shown in FIG. 7B.

Next, face detection processes executed in the respective four face detection modes will be described with reference to FIGS. 8 to 11.

Figure 8:
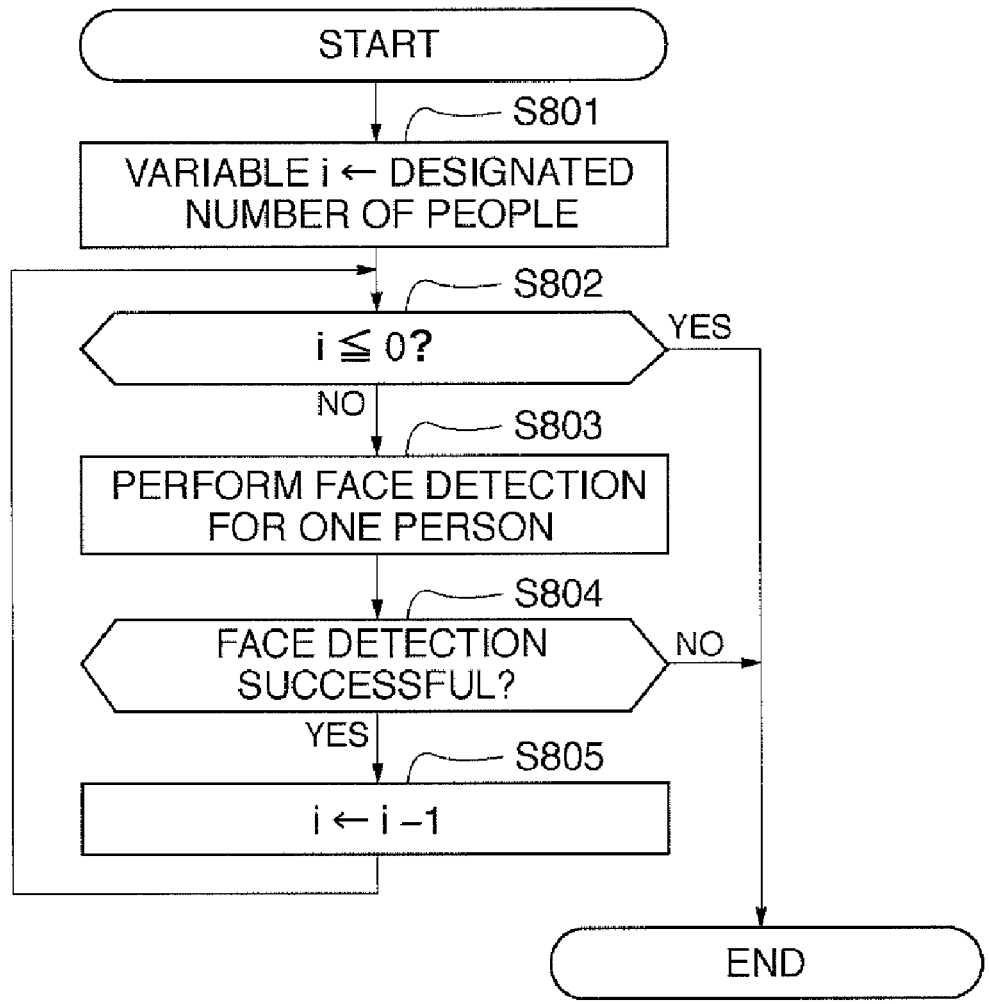
FIG. 8 is a flowchart of a face detection process in the face detection mode for detecting faces of a designated number of people.
Figure 9:
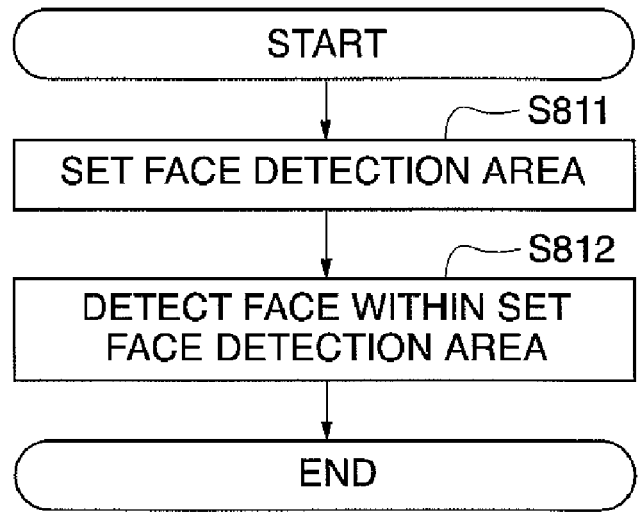
FIG. 9 is a flowchart of a face detection process in the face detection mode for detecting a face in a designated face detection area.
Figure 10:
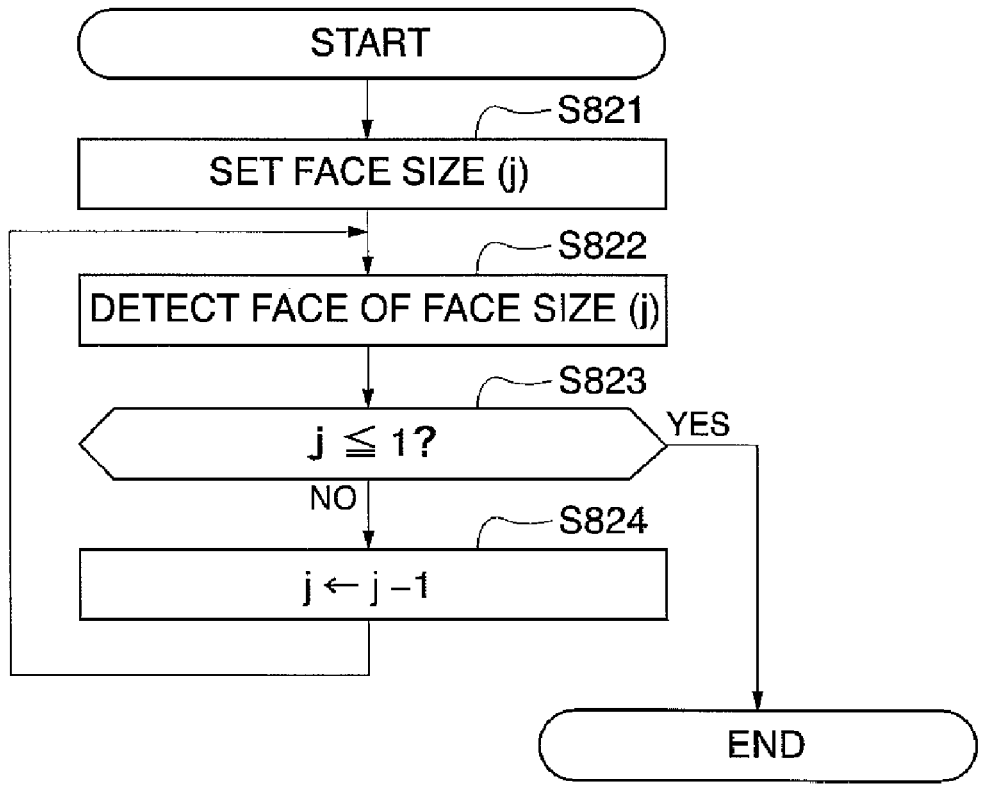
FIG. 10 is a flowchart of a face detection process in the face detection mode for detecting a face of a designated face size.
Figure 11:
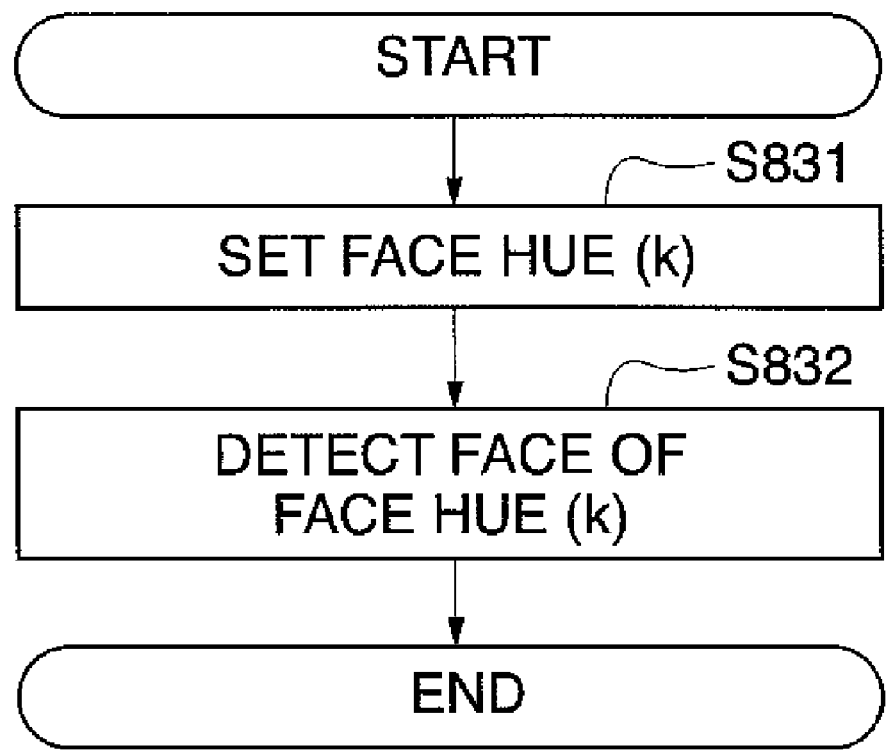
FIG. 11 is a flowchart of a face detection process in the face detection mode for detecting a face of a designated hue.

FIG. 8 is a flowchart of a face detection process in the face detection mode for detecting faces of a designated number of people. FIG. 9 is a flowchart of a face detection process in the face detection mode for detecting a face in a designated face detection area. FIG. 10 is a flowchart of a face detection process in the face detection mode for detecting a face of a designated face size. FIG. 11 is a flowchart of a face detection process in the face detection mode for detecting a face of a designated hue. The face detection processes shown by the respective flowcharts in FIGS. 8 to 11 are executed by the controller 104 (CPU 113) of the printing apparatus 1. In a case where face detection is performed by the image pickup apparatus 2, the face detection is carried out by the controller 204 (CPU 213), following the same face detection processes as executed by the controller 104 (CPU 113). Therefore, description of the face detection processes executed by the image pickup apparatus 2 is omitted.

In the face detection process in the face detection mode for detecting faces of a designated number of people, as shown in FIG. 8, the controller 104 assigns a value indicative of the number of people for detection, which has been designated by the user via the input section 105, to a variable i (step S801). Then, the controller 104 determines whether the variable i is not larger than 0 (step S802). If the variable i is larger than 0, the controller 104 performs face detection for one person (step S803). Then, the controller 104 determines whether or not the face detection for one person has been successfully performed (step S804). If the face detection for one person has not been successfully performed, the controller 104 determines that it is not possible to detect the face of a person any more e.g. due to absence of faces corresponding to the designated number, and terminates the present process.

If it is determined in the step S804 that the face detection for one person has been successfully performed, the controller 104 decrements the variable i by 1 (step S805), and returns to the step S802. Then, the controller 104 repeatedly carries out the steps S803 to S805 until the variable i becomes not larger than 0.

If it is determined in the step S802 that the variable i is not larger than 0, the controller 104 determines that detection of the faces of the designated number of people has been completed, followed by terminating the present process.

Although in the present embodiment, the detection process is terminated when detection of the faces of a designated number of people is completed, the process may be configured such that all faces are detected from an image and then only information on face areas corresponding to the designated number of people is recorded as the result of the detection.

In the face detection process in the face detection mode for detecting a face in a designated face detection area, as shown in FIG. 9, first, the controller 104 receives a parameter m designated by the user via the input section 105, and sets an area corresponding to the parameter m as a face detection area (step S811).

The user designates the parameter m by selecting from numerical values 1 to 10 which are associated with respective designable areas. For example, when the parameter m is set to 1, all the nine blocks are designated as a face detection area. When the parameter m is set to 2, the central block is designated as a face detection area. When the parameter m is set to 3, the block immediately above the central block is designated as a face detection area, and when the parameter m is set to 4, the block immediately below the central block is designated as a face detection area. When the parameter m is set to 5, the block to the upper left of the central block is designated as a face detection area, and when the parameter m is set to "6", the block to the upper right of the central block is designated as a face detection area. When the parameter m is set to "7", the block to the lower left of the central block is designated as a face detection area, and when the parameter m is set to "8", the block to the lower right of the central block is designated as a face detection area. When the parameter m is set to "9", the block on the left side of the central block is designated as a face detection area, and when the parameter m is set to "10", the block on the right side of the central block is designated as a face detection area.

Further, when the user desires to designate a plurality of blocks as a face detection area, the user has only to input numerical values of the parameter m corresponding to the respective blocks to be designated. For example, in the case of designating the four blocks as a face detection area as shown in FIG. 5B, the user inputs the numerical values 2, 4, "7", and "9" corresponding to the respective blocks as parameters m.

The method of designating a face detection area is not limited to the above described method, but a face detection area can be designated by a different method as well.

Then, the controller 104 detects the face of a person appearing in the designated face detection area (step S812), followed by terminating the present process.

In the face detection process in the face detection mode for detecting a face of a designated face size, as shown in FIG. 10, first, the controller 104 receives a face size (j) designated by the user via the input section 105, and sets this face size (j) as the size of a face for detection (step 5821). Face sizes are classified into the three size ranges of the "large" size, the "middle" size, and the "small" size as described hereinabove, and numerical values 1, 2, and 3 are assigned to the respective size ranges as the face size (j). For example, when the numerical value 1 is input as the face size (j), the "large" size is set as the size of a face for detection. When the numerical value 2 is input as the face size (j), the "middle" size is set as the size of a face for detection. In this case, faces of a size equal to or larger than the "middle" size are detected. More specifically, faces having respective face sizes belonging to the "middle" size range and the "large" size range are detected. Although by the illustrated example, face sizes are classified into the three size ranges, this is not limitative, but face sizes may be classified into any number of size ranges.

Next, the controller 104 detects a face of a size corresponding to the face size (j) (step S822). Then, the controller 104 determines whether the numerical value j of the face size (j) is not larger than 1 (step S823). If the numerical value j is larger than 1, the controller 104 decrements the numerical value j by 1 (step S824), and returns to the step S822, wherein detection of a face of a size corresponding to the face size (j) is performed.

If it is determined in the step S823 that the numerical value j is not larger than 1, the controller 104 judges that detection of faces of a size corresponding to and a size larger than the currently set face size (j) has been completed, followed by terminating the present process.

In the face detection process in the face detection mode for detecting a face of a designated hue, as shown in FIG. 11, first, the controller 104 receives a hue (k) designated by the user via the input section 105, and sets this hue (k) as the hue of a face for detection (step S831). Hues are classified into the three colors of "white", "yellow", and "brown" as described hereinabove, and numerical values 1, 2, and 3 are assigned to the respective hues. For example, when the numerical value 1 is input as the hue (k), the color "white" is set as a face hue for detection. When the numerical value 2 is input as the hue (k), the color "yellow" is set as the hue of a face for detection. When the numerical value 3 is input as the hue (k), the color "brown" is set as the hue of a face for detection. Although by the illustrated example, hues are classified into the three colors, this is not limitative, but hues may be classified into any number of colors.

Then, the controller 104 detects a face of the currently set hue (k) (step S832), followed by terminating the present process.

In the present embodiment, when an image is picked up by the image pickup apparatus 2, the above described face detection processes are executed, and information concerning the results of face detection is recorded as one of Exif tags in a single image file together with image data. The Exif tags store information as to whether or not each of face detection, red-eye detection, and red-eye correction has been executed, location information on the face areas, location information on red eyes, information on the face detection modes, information concerning detection accuracy, and so forth.

If the printing apparatus 1 is set to execute face detection, red-eye detection, and red-eye correction, the printing apparatus 1 performs face detection, red-eye detection, and red-eye correction on image data in an image file captured from the image pickup apparatus 2 or the memory card 130. In this case, the printing apparatus 1 acquires information recorded as the Exif tags in the image file captured from the image pickup apparatus 2 or the memory card 130, and determines, by referring to the acquired information, whether or not each of face detection, red-eye detection, and red-eye correction has been executed. Then, the printing apparatus 1 performs face detection, red-eye detection, and/or red-eye correction based on the result of the determination.

Figure 12:
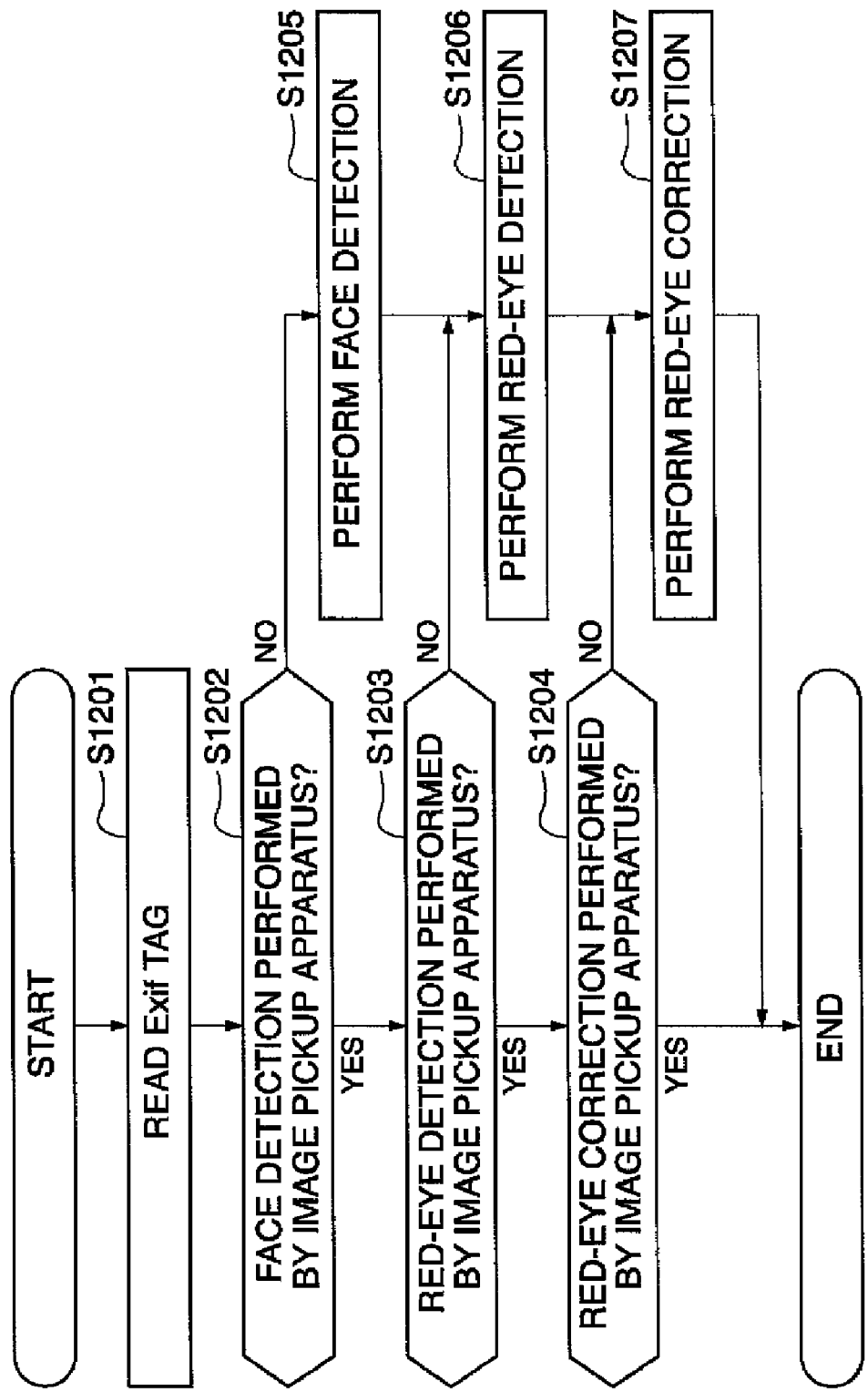
FIG. 12 is a flowchart of a process executed by the printing apparatus in FIG. 2, for face detection, red-eye detection, and/or red-eye correction, based on information recorded in Exif tags.

The process executed by the printing apparatus 1 for face detection, red-eye detection, and/or red-eye correction, based on information recorded in the Exif tags will be described with reference to FIG. 12. FIG. 12 is a flowchart of the process executed by the printing apparatus 1 for face detection, red-eye detection, and/or red-eye correction, based on information recorded in the Exif tags. The process shown in this flowchart is executed by the controller 104 (CPU 113). In the illustrated example, it is assumed that the Exif tags are recorded in an Exif image file captured from the image pickup apparatus 2 by the printing apparatus 1 via the interface 101. The following description also applies to a case where an Exif image file is captured from the memory card 130 mounted in the memory card slot 5.

As shown in FIG. 12, first, the controller 104 of the printing apparatus 1 reads the Exif tags from the Exif image file captured from the image pickup apparatus 2 (step S1201). Then, the controller 104 refers to information recorded in the captured Exif tags and determines whether or not face detection has been performed by the image pickup apparatus 2 (step S1202). If face detection has been performed by the image pickup apparatus 2, the controller 104 refers to the information recorded in the captured Exif tags and determines whether or not red-eye detection has been performed by the image pickup apparatus 2 (step S1203). If red-eye detection has been performed by the image pickup apparatus 2, the controller 104 refers to the information recorded in the captured Exif tags and determines whether or not red-eye correction has been performed by the image pickup apparatus 2 (step S1204). If red-eye correction has been performed by the image pickup apparatus 2, the controller 104 terminates the present process.

Thus, when all of face detection, red-eye detection and red-eye correction have been performed by the image pickup apparatus 2, the printing apparatus 1 is not required to perform any of face detection, red-eye detection and red-eye correction. Particularly when face detection, red-eye detection and red-eye correction that can be performed by the printing apparatus 1 are identical in level and method to the face detection, the red-eye detection and the red-eye correction already performed by the image pickup apparatus 2, the printing apparatus 1 need not repeat the same processes having already been executed once.

If it is determined in the step S1202 that face detection has not been performed by the image pickup apparatus 2, the controller 104 performs face detection for extracting a face from image data recorded in the captured image file (step S1205). Then, the controller 104 performs red-eye detection for detecting whether or not the extracted face has red-eye pupils (step S1206). Subsequently, the controller 104 performs red-eye correction based on the result of the red-eye detection (step S1207). More specifically, if red-eye pupils have been detected, color conversion is performed on the red-eye pupils so as to correct the color of the pupils, whereas if not, red-eye correction is omitted. Thereafter, the controller 104 terminates the present process.

As described above, when face detection has not been performed by the image pickup apparatus 2, each of face detection, red-eye detection and red-eye correction is performed by the printing apparatus 1. Further, information indicating that the face detection, the red-eye detection and the red-eye correction have been performed by the printing apparatus 1 is additionally recorded as an Exif tag in the image file.

If face detection has been performed, but it is determined in the step S1203 that red-eye detection has not been performed yet, the controller 104 performs red-eye detection (step S1206). In this case, the Exif tags store information identifying a detected face, so that the detected face is identified based on the information, and red-eye detection is performed on the face. Then, the controller 104 performs red-eye correction based on the result of the red-eye detection (step S1207), followed by terminating the present process.

Thus, when the image pickup apparatus 2 has performed face detection, but not red-eye detection, red-eye detection and red-eye correction are performed by the printing apparatus 1. Further, information indicating that the red-eye detection and the red-eye correction have been performed by the printing apparatus 1 is additionally recorded as an Exif tag in the image file.

If face detection and red-eye detection have been performed, but it is determined in the step S1204 that red-eye correction has not been performed yet, the controller 104 performs red-eye correction (step S1207). In this case, the Exif tags stores information identifying a detected face and information indicative of a result of the red-eye detection. The controller 104 determines, based on the result of the red-eye detection recorded in the Exif tags, whether or not red-eye pupils have been detected. If it is determined that red-eye pupils have been detected, the controller 104 corrects the color of the red-eye pupils, followed by terminating the present process.

Thus, when the image pickup apparatus 2 has performed face detection and red-eye detection, but not red-eye correction, red-eye correction is performed by the printing apparatus 1. Further, information indicating that the red-eye correction has been performed by the printing apparatus 1 is additionally recorded as an Exif tag in the image file.

Figure 13:
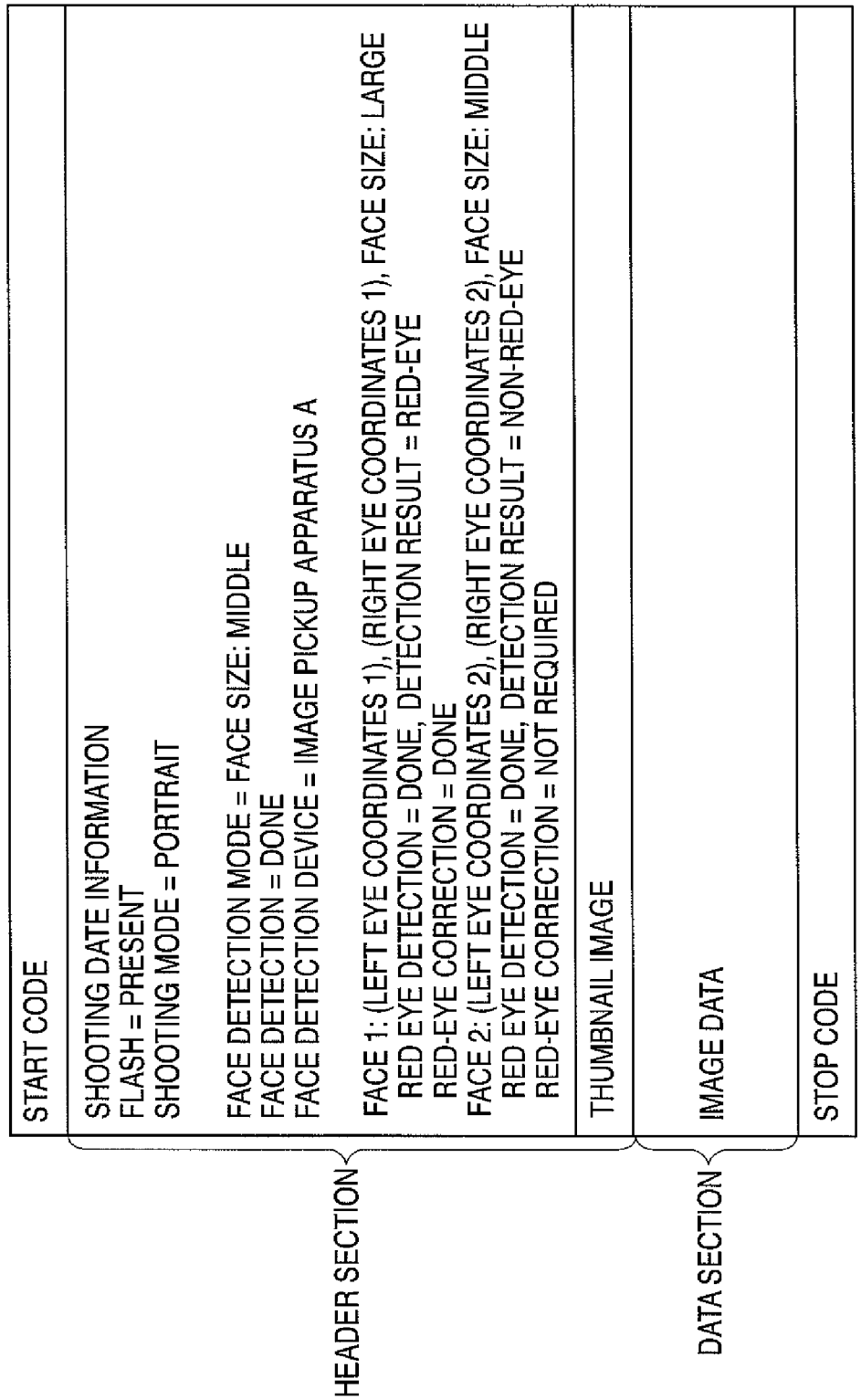
FIG. 13 is a diagram of an example of an Exif image file captured by the printing apparatus.
Figure 14:
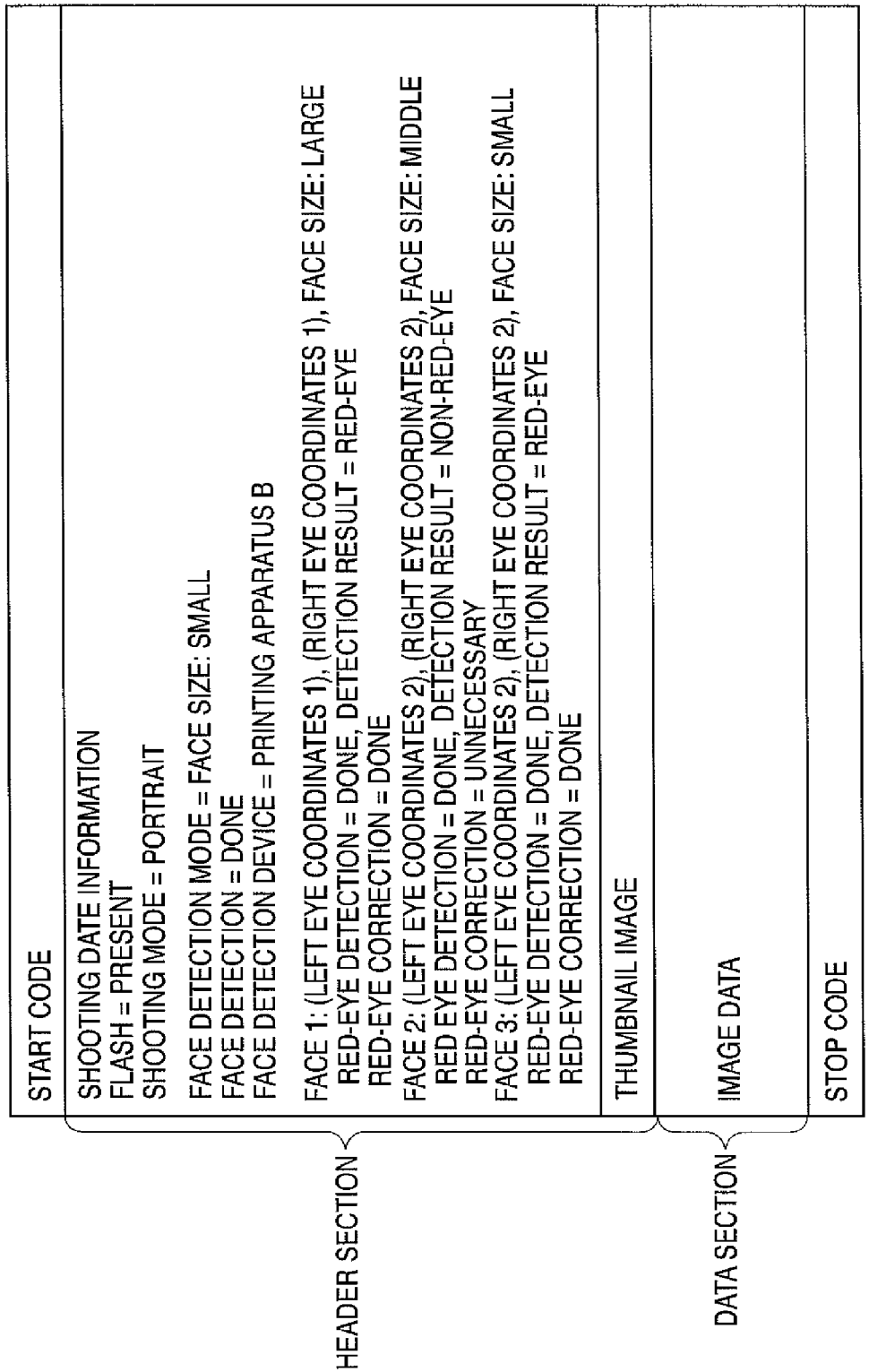
FIG. 14 is a diagram of another example of an Exif image file captured by the printing apparatus.

Now, the structure of the Exif image file captured by the printing apparatus 1 will be described with reference to FIGS. 13 and 14. FIG. 13 is a diagram of an example of the Exif image file captured by the printing apparatus 1. FIG. 14 is a diagram of another example of the Exif image file captured by the printing apparatus 1.

For example, when all of face detection, red-eye detection, and red-eye correction have been performed by the image pickup apparatus 2, information indicative of the fact is stored as Exif tags in the header section of the image file together with shooting information, as shown in FIG. 13. By the illustrated example, an "image pickup apparatus A" is described as a face detection device, a face detection flag as "done", a face detection mode as "face size designation", and a face size (parameter) as "middle".

Further, in the illustrated example, it is described that two faces, i.e. a face 1 and a face 2, have been detected. According to the description of the face 1, the face size thereof is "large", red-eye detection is "done", and pupils are "red-eye", and red-eye correction is "done". According to the description of the face 2, the face size thereof is "middle", red-eye detection is "done" and pupils are "non-red-eye", and red-eye correction is "not required".

If face detection was not performed by the image pickup apparatus 2, information indicating that face detection, red-eye detection, and red-eye correction have been performed by the printing apparatus 1 is recorded as Exif tags, as shown in FIG. 14.

In the illustrated example, a "printing apparatus B" is described as a face detection device, a face detection flag as "done", a face detection mode as "face size designation", and a face size (parameter) as "small". Further, by the illustrated example, it is described that three faces, i.e. a face 1, a face 2, and a face 3 have been detected. Furthermore, similarly to the case shown in FIG. 13, a description of a face size, a result of red-eye detection, and a result of red-eye correction are presented in association with each of the faces 1 to 3. Although in the present embodiment, the Exif file is used to record the results of face detection and red-eye detection as attribute information on an image, the detection results may be recorded in other forms.

As described above, according to the present embodiment, since the processes of face detection, red-eye detection, and red-eye correction can be executed by either the image pickup apparatus 2 or the printing apparatus 1, it is possible to perform red-eye correction efficiently. Further, it is possible to reduce time required for printing out image data that needs red-eye correction. In short, it is possible to prevent degradation of productivity due to execution of red-eye correction.

Furthermore, a face detection mode suitable for detecting an object within an image can be selected from a plurality of face detection modes, which makes it possible to enhance the accuracy of red-eye correction.

Figure 15:
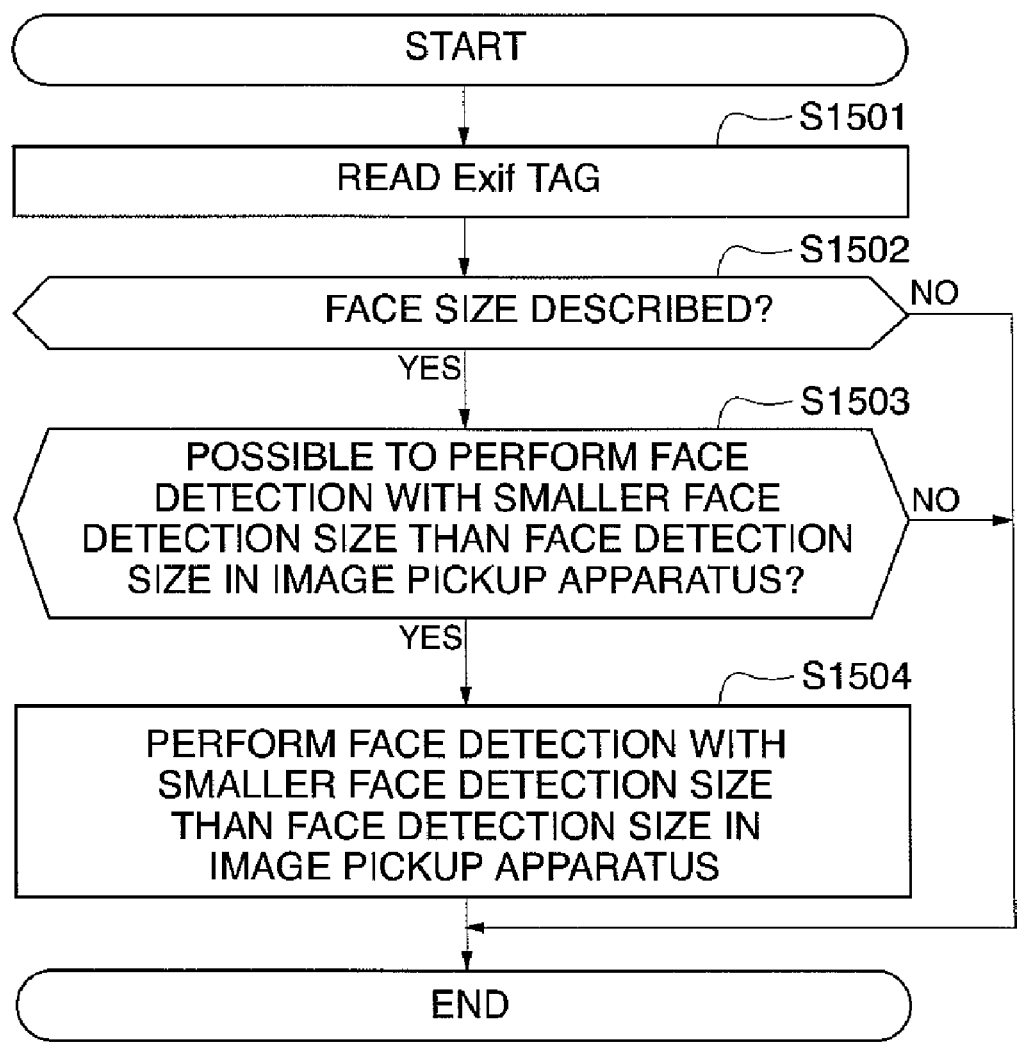
FIG. 15 is a flowchart of a face detection process executed by a printing apparatus according to a second embodiment of the present invention.
Figure 16:
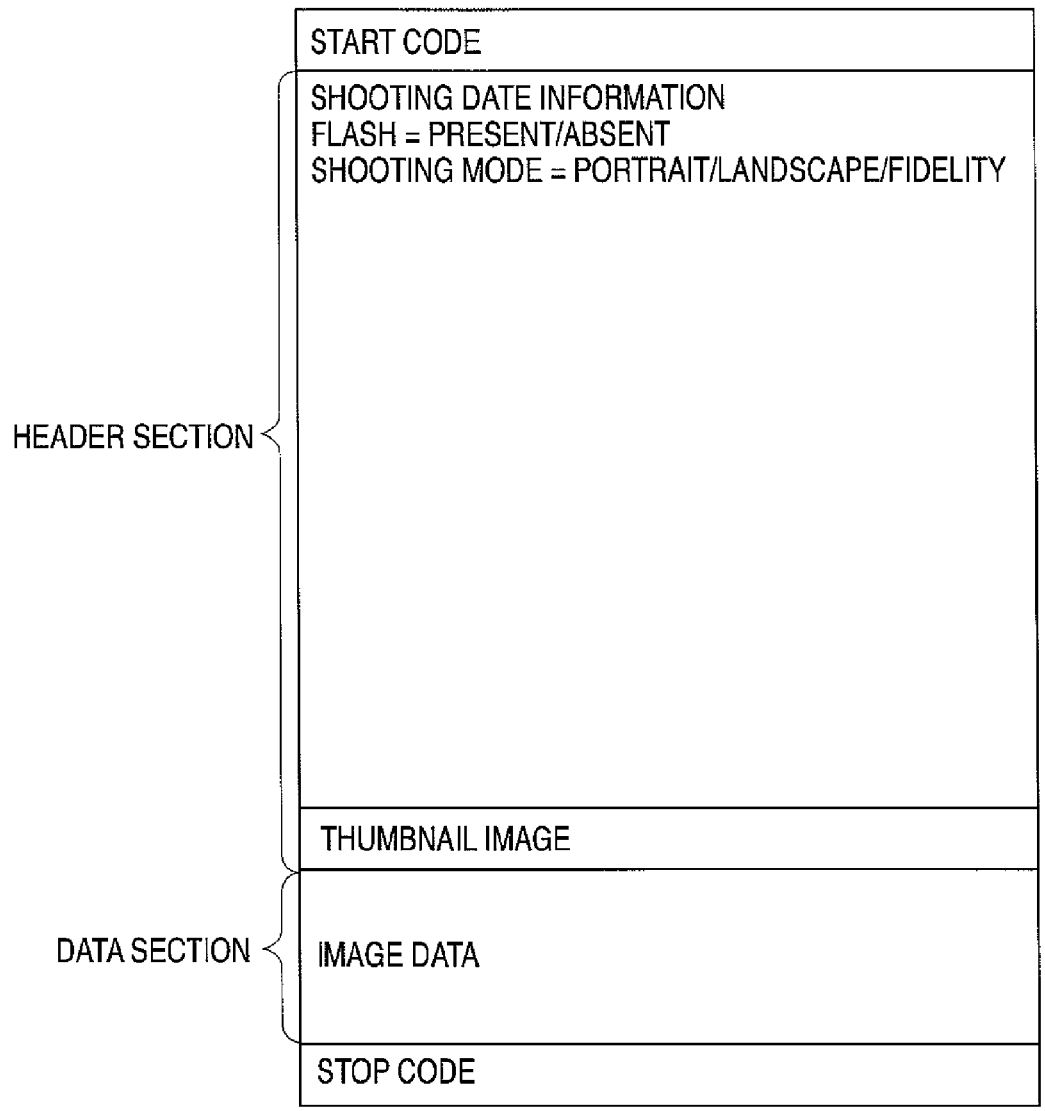
FIG. 16 is a diagram of the structure of an Exif image file.

Next, a second embodiment of the present invention will be described with reference to FIG. 15. FIG. 15 is a flowchart of a face detection process executed by a printing apparatus according to the second embodiment. It should be noted that the present embodiment has the same hardware configuration as that of the first embodiment. Therefore, corresponding components are designated by the same reference numerals, and detailed description thereof is omitted.

In the printing apparatus 1 according to the present embodiment, if it is possible to perform face detection at a higher face detection level than a face detection level of a face detection performed by the image pickup apparatus 2, face detection is performed at the higher face detection level. The face detection level corresponds to the magnitude of a face detection size in the face detection mode executed by designating a face detection size. As the face detection size is smaller, it means that the face detection level is higher. In other words, as the face detection level is set higher, it is possible to further enhance the accuracy of face detection.

After starting an image pickup operation, if the image pickup apparatus 2 takes long processing time to record image data in a memory card, the user is under stress. To avoid this problem, when executing face detection by the image pickup apparatus 2, it is usual to set the face detection level low.

On the other hand, the printing apparatus 1 can afford to take more processing time than the image pickup apparatus 2, and therefore the use of the printing apparatus 1 for face detection makes it possible to perform higher-accuracy face detection (i.e. face detection at a higher face detection level).

Specifically, as shown in FIG. 15, first, the controller 104 of the printing apparatus 1 reads Exif tags from an Exif-formatted image file captured from the image pickup apparatus 2 (step S1501). Then, the controller 104 determines whether or not a face detection size is described in the read Exif tags (step S1502). If no face detection size is described, the controller 104 terminates the present process.

On the other hand, if a face detection size is described in the read Exif tags, the controller 104 determines whether or not it is possible to perform face detection with a smaller face detection size than the described face detection size (step S1503). A case where it is impossible to perform face detection with a smaller face detection size than the described face detection size means a case where the printing apparatus 1 cannot perform face detection at a higher detection level than the face detection level at which the face detection was performed by the image pickup apparatus 2. In this case, the controller 104 determines not to cause the printing apparatus 1 to perform face detection, followed by terminating the present process.

On the other hand, a case where it is possible to perform face detection with a smaller face detection size than the described face detection size means a case where the printing apparatus 1 can perform face detection at a higher detection level than the face detection level at which the face detection was performed by the image pickup apparatus 2. In this case, the controller 104 determines to cause the printing apparatus 1 to perform face detection, and the face detection is performed with a smaller face detection size than the described face detection size (step S1504), followed by terminating the present process.

After face detection is thus performed by the printing apparatus 1 at a higher detection level than in the image pickup apparatus 2, red-eye detection for detecting whether or not red eye has occurred in a detected face is performed, and then red-eye correction is performed based on the result of the red-eye detection.

For example, if face detection was performed by the image pickup apparatus 2 with a "small" face detection size, the printing apparatus 1 cannot perform face detection with a smaller face detection size than the "small" face detection size. On the other hand, when face detection was performed by the image pickup apparatus 2 with a "large" or "middle" face detection size, the printing apparatus 1 performs face detection with the "middle" or "small" face detection size which is smaller than the "large" or "middle" face detection size.

Although in the present embodiment, the detection level in the face detection mode for detecting a face of a designated face size is described, the description also applies to the other face detection modes. In any of the other face detection modes as well, it is only required to cause the printing apparatus 1 to carry out a higher-accuracy detection process than a face detection process or a red-eye detection process already performed by the image pickup apparatus 2 and recorded as Exif information.

For example, in the face detection mode for detecting faces of a designated number of people, a method may be employed in which the number of people for detection is recorded in an Exif tag, and when the printing apparatus is capable of detecting faces of people of a larger number than the number of people recorded in the Exif tag, the printing apparatus is caused to perform face detection.

Further, in the face detection mode for detecting a face in a designated face detection area, a method may be employed in which information of a face detection area is recorded in an Exif tag, and when the printing apparatus is capable of performing face detection in a different area from the face detection area recorded in the Exif tag, it is only required to cause the printing apparatus to perform area-specific face detection in the different area. Also when the printing apparatus is capable of performing face detection in a larger area than the face detection area recorded in the Exif tag, the printing apparatus may be caused to carry out area-specific face detection.

In the face detection mode for detecting a face of a designated hue as well, a method may be employed in which information of a hue is recorded in an Exif tag, and when the printing apparatus is capable of detecting a face of a different hue from the hue recorded in the Exif tag, the printing apparatus may be caused to carry out face detection.

As described above, in the present embodiment, the printing apparatus performs face detection and red-eye detection according to information recorded in Exif tags concerning face detection and red-eye detection performed by the image pickup apparatus. Therefore, it is possible to prevent the printing apparatus from carrying out the same detection process as was already performed by the image pickup apparatus in a duplicated manner. Further, since the printing apparatus performs face detection and red-eye detection only when the printing apparatus is capable of performing the processes at a higher level than the image pickup apparatus did, it is possible not only to avoid execution of wasteful detection processing, but also to cause the printing apparatus to carry out only higher-accuracy and appropriate processing.

In a case where the image pickup apparatus performs face detection, red-eye detection, and red-eye correction, the processes are executed during shooting, and the results are recorded at the same time. Therefore, if processing that increases load on the image pickup apparatus is carried out, a shooting time period is prolonged. On the other hand, the printing apparatus is less subject to constraints than the image pickup apparatus, so that the printing apparatus can take time to perform more accurate detection processes than the image pickup apparatus does.

Further, in a case where the printing apparatus is not capable of performing higher-accuracy or any higher-accuracy face detection or red-eye detection than corresponding detection recorded as Exif information, face detection or red-eye detection is not performed by the printing apparatus, so that it is possible to prevent the printing apparatus from carrying out the same detection process as was already performed by the image pickup apparatus in a duplicated manner.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-127192 filed May 11, 2007, which is hereby incorporated by reference herein in its entirety.

What is claimed is:

1. An image processing device comprising:
an acquisition unit configured to acquire image data and information concerning a face detection process performed on the image data;
a determination unit configured to determine a face detection process to be performed on the image data acquired by said acquisition unit, based on the information acquired by said acquisition unit; and
a face detection unit configured to perform the face detection process determined by said determination unit on the image data,
wherein the information contains an information item concerning detection accuracy of the face detection process performed on the image data,
wherein said determination unit determines a face detection process, with a higher detection accuracy than the detection accuracy of the face detection process described in the information, as the face detection process to be performed by said face detection unit,
wherein the detection accuracy of the face detection process performed on the image data is described in the information, and
wherein when said face detection unit is not capable of performing a face detection process with a higher detection accuracy than the detection accuracy described in the information, said determination unit determines to not cause said face detection unit to perform a face detection process.

2. An image processing device as claimed in claim 1, wherein:
a number of detection areas in the face detection process performed on the image data is described in the information, and
when said face detection unit is capable of performing a face detection process in detection areas of a larger number than the number of the detection areas described in the information, said determination unit determines to cause said face detection unit to perform a face detection process in detection areas of a larger number than the number of the detection areas described in the information.

3. An image processing device as claimed in claim 1, wherein:
a face size of a detectable face in the face detection process performed on the image data is described in the information, and
when said face detection unit is capable of performing a face detection process with reference to a smaller face size than the face size described in the information, said determination unit determines to cause said face detection unit to perform a face detection process with reference to a smaller face size than the face size described in the information.

4. An image processing device as claimed in claim 1, wherein:
a detection area in the face detection process performed on the image data is described in the information, and
when said face detection unit is capable of performing a face detection process in a different detection area from the detection area described in the information, said determination unit determines to cause said face detection unit to perform a face detection process in a different detection area from the detection area described in the information.

5. An image processing device as claimed in claim 1, wherein:
an information item concerning a detection area in the face detection process performed on the image data is described in the information, and
when said face detection unit is capable of performing a face detection process in a larger detection area than the detection area described in the information, said determination unit determines to cause said face detection unit to perform a face detection process in a larger detection area than the detection area described in the information.

6. An image processing device as claimed in claim 1, wherein the information concerns a face detection process executed during shooting.

7. An image processing device as claimed in claim 1, wherein the information concerns a face detection process executed by an external apparatus.

8. An image processing device as claimed in claim 1, further comprising:
a correction unit configured to correct the image data according to a result of the face detection process executed by said face detection unit; and
a printing unit configured to print out the image data corrected by said correction unit.

9. An image processing method comprising:
an acquisition step of acquiring image data and information concerning a face detection process performed on the image data;
a determination step of determining a face detection process to be performed on the image data acquired in said acquisition step, based on the information acquired in said acquisition step; and a face detection step of performing the face detection process determined in said determination step on the image data, wherein the information contains an information item concerning detection accuracy of the face detection process performed on the image data, and in said determination step, a face detection process with higher detection accuracy than the detection accuracy of the face detection process described in the information is determined as the face detection process to be performed in said face detection step, wherein the detection accuracy of the face detection process performed on the image data is described in the information, and wherein when said face detection step cannot perform a face detection process with a higher detection accuracy than the detection accuracy of the face detection process described in the information, said determination step determines that said face detecting step is to not perform a face detection process.

10. An image processing method as claimed in claim 9, wherein the information concerns a face detection process executed during shooting by an external apparatus.

11. An image processing method as claimed in claim 9, further comprising:
   a correction step of correcting the image data according to a result of the face detection process executed in said face detection step; and
   a printing step of printing out the image data corrected in said correction step.

12. A non-transitory computer readable storage medium storing a computer program executable by a computer to execute an image processing method comprising:
   an acquisition step of acquiring image data and information concerning a face detection process performed on the image data;
   a determination step of determining a face detection process to be performed on the image data acquired in said acquisition step based on the information acquired in said acquisition step; and
   a face detection step of performing the face detection process determined in said determination step on the image data, wherein the information contains an information item concerning detection accuracy of the face detection process performed on the image data, wherein said determination step determines a face detection process, with a higher detection accuracy than the detection accuracy of the face detection process described in the information, as the face detection process to be performed in said face detection step, wherein the detection accuracy of the face detection process performed on the image data is described in the information, and wherein when a face detection step cannot perform a face detection step with a higher detection accuracy than the detection accuracy of the face detection process described in the information, said determination step determines that said face detection step is to not perform a face detection process.

13. An image processing device comprising:
   an acquisition unit configured to acquire image data and information concerning a red-eye detection process performed on the image data;
   a determination unit configured to determine a red-eye detection process to be performed on the image data acquired by said acquisition unit, based on the information acquired by said acquisition unit; and
   a red-eye detection unit configured to perform the red-eye detection process determined by said determination unit on the image data, wherein the information contains an information item concerning detection accuracy of the red-eye detection process performed on the image data, wherein said determination unit determines a red-eye detection process, with a higher detection accuracy than the detection accuracy of the red-eye detection process described in the information, as the red-eye detection process to be performed by said red-eye detection unit, wherein the detection accuracy of the red-eye detection process performed on the image data is described in the information, and wherein when said red-eye detection unit is not capable of performing a red-eye detection process with a higher detection accuracy than the detection accuracy of the red-eye detection process described in the information, said determination unit determines not to cause said red-eye detection unit to perform a red-eye detection process.

14. An image processing device as claimed in claim 13, wherein:
   a number of detection areas in the red-eye detection process performed on the image data is described in the information, and
   when said red-eye detection unit is capable of performing a red-eye detection process in detection areas of a larger number than the number of the detection areas described in the information, said determination unit determines to cause said red-eye detection unit to perform a red-eye detection process in the detection areas of a larger number than the number of the detection areas described in the information.

15. An image processing device as claimed in claim 13, wherein:
   a detection area in the red-eye detection process performed on the image data is described in the information, and
   when said red-eye detection unit is capable of performing a red-eye detection process in a different detection area from the detection area described in the information, said determination unit determines to cause said red-eye detection unit to perform a red-eye detection process in a different detection area from the detection area described in the information.

16. An image processing device as claimed in claim 13, wherein:
   a detection area in the red-eye detection process performed on the image data is described in the information, and
   when said red-eye detection unit is capable of performing a red-eye detection process in a larger detection area than the detection area described in the information, said determination unit determines to cause said red-eye detection unit to perform a red-eye detection process in a larger detection area than the detection area described in the information.

17. An image processing device as claimed in claim 13, wherein the information concerns a red-eye detection process executed during shooting.

18. An image processing device as claimed in claim 13, wherein the information concerns a red-eye detection process and a red-eye correction process executed by an external apparatus.

19. An image processing device as claimed in claim 13, further comprising:

a correction unit configured to correct the image data according to a result of the red-eye detection process executed by said red-eye detection unit, and a printing unit configured to print out the image data corrected by said correction unit.

20. An image processing method comprising:

an acquisition step of acquiring image data and information concerning a red-eye detection process performed on the image data;

a determination step of determining a red-eye detection process to be performed on the image data acquired in said acquisition step, based on the information acquired in said acquisition step; and a red-eye detection step of performing the red-eye detection process determined in said determination step on the image data, wherein the information contains an information item concerning detection accuracy of the red-eye detection process performed on the image data, wherein said determination step determines a red-eye detection process, with a higher detection accuracy than the detection accuracy described in the information, as the red-eye detection process to be performed in said red-eye detection step, wherein the detection accuracy of the red-eye detection process performed on the image data is described in the information, and wherein when said red-eye detection step cannot perform a red-eye detection process with a higher detection accuracy than the detection accuracy described in the information, said determination step determines that said red-eye detection step is to not perform a red-eye detection process.

21. An image processing method as claimed in claim 20, wherein the information concerns a red-eye detection process executed during shooting by an external apparatus.

22. An image processing method as claimed in claim 20, further comprising:

a correction step of correcting the image data according to a result of the red-eye detection process executed in said red-eye detection step; and a printing step of printing out the image data corrected in said correction step.

23. A non-transitory computer readable storage medium storing a computer program executable by a computer to execute an image processing method comprising:

an acquisition step of acquiring image data and information concerning a red-eye detection process performed on the image data;

a determination step of determining a red-eye detection process to be performed on the image data acquired in said acquisition step based on the information acquired in said acquisition step; and a red-eye detection step of performing the red-eye detection process determined in said determination step on the image data, wherein the information contains an information item concerning a detection accuracy of the red-eye detection process performed on the image data, wherein said determination step determines a red-eye detection process with a higher detection accuracy than the detection accuracy described in the information as the red-eye detection process to be performed in said red-eye detection step, wherein the detection accuracy of the red-eye detection process performed on the image data is described in the information, and wherein when said red-eye detection step cannot perform a red-eye detection process with a higher detection accuracy than the detection accuracy described in the information, said determination step determines that said red-eye detection step is to not perform a red-eye detection process.

24. An image processing device comprising:

an acquisition unit configured to acquire image data and information concerning a face detection process performed on the image data;

a determination unit configured to determine a face detection process to be performed on the image data acquired by said acquisition unit, based on the information acquired by said acquisition unit; and a face detection unit configured to perform the face detection process determined by said determination unit on the image data, wherein the information contains an information item concerning detection level of the face detection process performed on the image data, wherein said determination unit determines a face detection process, with a higher detection level than the detection level of the face detection process described in the information, as the face detection process to be performed by said face detection unit, wherein the detection level of the face detection process performed on the image data is described in the information, and wherein when said face detection unit is not capable of performing a face detection process with a higher detection level than the detection level described in the information, said determination unit determines to not cause said face detection unit to perform a face detection process.

25. An image processing method comprising:

an acquisition step of acquiring image data and information concerning a face detection process performed on the image data;

a determination step of determining a face detection process to be performed on the image data acquired in said acquisition step, based on the information acquired in said acquisition step; and a face detection step of performing the face detection process determined in said determination step on the image data, wherein the information contains an information item concerning detection level of the face detection process performed on the image data, and in said determination step, a face detection process with higher detection level than the detection level of the face detection process described in the information is determined as the face detection process to be performed in said face detection step, wherein the detection level of the face detection process performed on the image data is described in the information, and wherein when said face detection step cannot perform a face detection process with a higher detection level than the detection level of the face detection process described in the information, said determination step determines that said face detecting step is to not perform a face detection process.

26. A non-transitory computer readable storage medium storing a computer program executable by a computer to execute an image processing method comprising:

an acquisition step of acquiring image data and information concerning a face detection process performed on the image data;
a determination step of determining a face detection process to be performed on the image data acquired in said acquisition step based on the information acquired in said acquisition step; and
a face detection step of performing the face detection process determined in said determination step on the image data,
wherein the information contains an information item concerning detection level of the face detection process performed on the image data,
wherein said determination step determines a face detection process, with a higher detection level than the detection level of the face detection process described in the information, as the face detection process to be performed in said face detection step,
wherein the detection level of the face detection process performed on the image data is described in the information, and
wherein when a face detection step cannot perform a face detection step with a higher detection level than the detection level of the face detection process described in the information, said determination step determines that said face detection step is to not perform a face detection process.

27. An image processing device comprising:
an acquisition unit configured to acquire image data and information concerning a red-eye detection process performed on the image data;
a determination unit configured to determine a red-eye detection process to be performed on the image data acquired by said acquisition unit, based on the information acquired by said acquisition unit; and
a red-eye detection unit configured to perform the red-eye detection process determined by said determination unit on the image data,
wherein the information contains an information item concerning detection level of the red-eye detection process performed on the image data,
wherein said determination unit determines a red-eye detection process, with a higher detection level than the detection level of the red-eye detection process described in the information, as the red-eye detection process to be performed by said red-eye detection unit,
wherein the detection level of the red-eye detection process performed on the image data is described in the information, and
wherein when said red-eye detection unit is not capable of performing a red-eye detection process with a higher detection level than the detection level of the red-eye detection process described in the information, said determination unit determines not to cause said red-eye detection unit to perform a red-eye detection process.

28. An image processing method comprising:
an acquisition step of acquiring image data and information concerning a red-eye detection process performed on the image data;
a determination step of determining a red-eye detection process to be performed on the image data acquired in said acquisition step, based on the information acquired in said acquisition step; and
a red-eye detection step of performing the red-eye detection process determined in said determination step on the image data,
wherein the information contains an information item concerning detection level of the red-eye detection process performed on the image data, wherein said determination step determines a red-eye detection process, with a higher detection level than the detection level described in the information, as the red-eye detection process to be performed in said red-eye detection step,
wherein the detection level of the red-eye detection process performed on the image data is described in the information, and
wherein when said red-eye detection step cannot perform a red-eye detection process with a higher detection level than the detection level described in the information, said determination step determines that said red-eye detection step is to not perform a red-eye detection process.

29. A non-transitory computer readable storage medium storing a computer program executable by a computer to execute an image processing method comprising:
an acquisition step of acquiring image data and information concerning a red-eye detection process performed on the image data;
a determination step of determining a red-eye detection process to be performed on the image data acquired in said acquisition step based on the information acquired in said acquisition step; and
a red-eye detection step of performing the red-eye detection process determined in said determination step on the image data,
wherein the information contains an information item concerning a detection level of the red-eye detection process performed on the image data,
wherein said determination step determines a red-eye detection process with a higher detection level than the detection level described in the information as the red-eye detection process to be performed in said red-eye detection step,
wherein the detection level of the red-eye detection process performed on the image data is described in the information, and
wherein when said red-eye detection step cannot perform a red-eye detection process with a higher detection level than the detection level described in the information, said determination step determines that said red-eye detection step is to not perform a red-eye detection process.

30. An image processing device comprising:
an acquisition unit configured to acquire image data and information concerning a process concerning a face detection performed on the image data;
a determination unit configured to determine a process concerning a face detection to be performed on the image data acquired by said acquisition unit, based on the information acquired by said acquisition unit; and
a face detection unit configured to perform the process concerning a face detection determined by said determination unit on the image data,
wherein the information contains an information item concerning detection level of the process concerning a face detection performed on the image data,
wherein said determination unit determines a process concerning a face detection, with a higher detection level than the detection level of the process concerning a face detection described in the information, as the process concerning a face detection to be performed by said face detection unit, wherein the detection level of the process concerning a face detection performed on the image data is described in the information, and wherein when said face detection unit is not capable of performing a process concerning a face detection with a higher detection level than the detection level described in the information, said determination unit determines to not cause said face detection unit to perform a process concerning a face detection.

31. An image processing method comprising:

an acquisition step of acquiring image data and information concerning a process concerning a face detection performed on the image data;

a determination step of determining a process concerning a face detection to be performed on the image data acquired in said acquisition step, based on the information acquired in said acquisition step; and a face detection step of performing the process concerning a face detection determined in said determination step on the image data, wherein the information contains an information item concerning detection level of the process concerning a face detection performed on the image data, and in said determination step, a process concerning a face detection with higher detection level than the detection level of the process concerning a face detection described in the information is determined as the process concerning a face detection to be performed in said face detection step, wherein the detection level of the process concerning a face detection performed on the image data is described in the information, and wherein when said face detection step cannot perform a process concerning a face detection with a higher detection level than the detection level of the process concerning a face detection described in the information, said determination step determines that said face detecting step is to not perform a process concerning a face detection.

32. A non-transitory computer readable storage medium storing a computer program executable by a computer to execute an image processing method comprising:

an acquisition step of acquiring image data and information concerning a process concerning a face detection performed on the image data;

a determination step of determining a process concerning a face detection to be performed on the image data acquired in said acquisition step based on the information acquired in said acquisition step; and a face detection step of performing the process concerning a face detection determined in said determination step on the image data, wherein the information contains an information item concerning detection level of the process concerning a face detection performed on the image data, wherein said determination step determines a process concerning a face detection, with a higher detection level than the detection level of the process concerning a face detection described in the information, as the process concerning a face detection to be performed in said face detection step, wherein the detection level of the process concerning a face detection performed on the image data is described in the information, and wherein when a face detection step cannot perform a face detection step with a higher detection level than the detection level of the process concerning a face detection described in the information, said determination step determines that said face detection step is to not perform a process concerning a face detection.

* * * * *